June 24, 1930.   G. T. SCHMIDLING   1,765,453
TELEVISION APPARATUS
Filed March 1, 1929
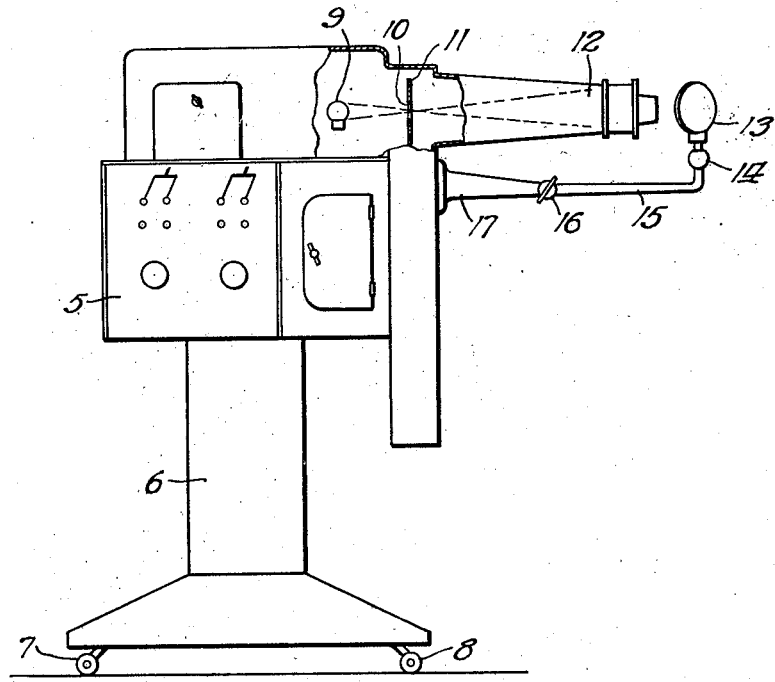
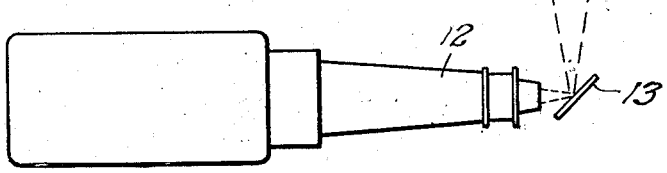
Inventor
Gilbert T. Schmidling
By Zabel & Banning Attys Patented June 24, 1930

1,765,453

UNITED STATES PATENT OFFICE

GILBERT T. SCHMIDLING, OF CHICAGO, ILLINOIS, ASSIGNOR TO ALVA J. CARTER, OF CHICAGO, ILLINOIS

TELEVISION APPARATUS

Application filed March 1, 1929. Serial No. 343,644.

My invention relates to television apparatus, and more particularly to a device adapted to be used in the taking of television impressions to be transmitted to a suitable receiving device and there projected upon a screen.

It is the principal purpose of this invention to provide means whereby a subject which is being transmitted by the apparatus may be more readily reached as it moves around and a larger range for a given apparatus attained.

One of the difficulties encountered in the use of apparatus of this character lies in the fact that where a group of subjects, such, for instance, as actors upon a stage, are to be transmitted, the machine is so unwieldy that it cannot be readily moved so as to take in the entire width of the group, and at the present time it is impracticable to take a very large section of view without shifting the machine. This invention contemplates the provision of means whereby the machine may be readily trained upon a different subject at a distance from the first subject with a minimum amount of effort and delay.

I will describe one form which the invention may take by reference to the accompanying drawings, wherein—

Fig. 1 illustrates a television transmitting apparatus having my invention applied thereto; and Fig. 2 is a top plan view of the same device.

Referring now in detail to the drawings, I show at 5 a casing wherein the means for causing light reflections from a subject in order that they may be converted into electrical energy that may be transmitted over wires or via radio, is housed. The apparatus for converting the light reflections from the subject into electrical energy is not contained in casing 5, but on separate tripods, and is not involved in this application. Casing 5 contains a motor for a scanning disc, and control apparatus for the motor and light source. This casing 5 is mounted upon a pedestal 6 suitably supported by casters, such as 7 and 8, so that it may be moved around the room. At 9 I indicate the light source which is projected through the aperture 10 in a scanning disc 11, and then through the lens 12. Normally, this lens itself would be trained upon the subject that is to be transmitted. However, if the unwieldy machine is to be shifted around each time the subject changes position, or each time a new subject is to be transmitted, a very slow and unsatisfactory change must result. I therefore provide means whereby the subject may be followed without the necessity of shifting the machine, so long as the subject remains within certain limits.

This means consists of a mirror 13 mounted in front of the lens 12 and so mounted that it may be readily adjusted to direct the light at any one of several angles relative to the machine. That is to say, the angle at which the light strikes the mirror 13 from the lens will, of course, be the angle at which it will leave the mirror, and by changing the angle of the mirror relative to the lens the light beam from the mirror may be directed in any one of a plurality of directions. I mount the mirror in a ball and socket joint, as shown at 14, upon an extension arm 15 that is adjustably pivoted at 16 to a bracket 17 on the main housing of the machine. Thus the mirror may be set at the proper level by means of the adjustment at 16 and thereafter moved into the proper position for each individual subject by turning it in the socket joint 14.

This device makes it possible to readily shift from one of a group of subjects to another without in any way disturbing the transmitting machine and subjecting it to jars that might cause distortion in the image transmitted. It is especially useful where a group of subjects, such as actors on a stage, are being transmitted, although, of course it is applicable to any situation where it is desired to change from one subject to another rapidly or to follow a moving subject.

Having thus described my invention, what I claim as new and desire to secure by Letters Patent is:

1. In television apparatus, a device having means for directing a beam of light through a scanning disk and a lens, means associated with said lens for directing the light emanating therefrom in any one of several directions comprising an arm on said device having an extension projecting to a point adjacent the outer end of said lens, and a mirror adjustably mounted on said extension in the field of view of said lens.

2. In television apparatus, a device having means for directing a beam of light through a scanning disk and a lens, means associated with said lens for directing the light emanating therefrom in any one of several directions comprising an arm on said device having an extension projecting to a point adjacent the outer end of said lens, and a mirror adjustably mounted on said extension in the field of view of said mirror and arm being connected by a ball and socket joint.

In witness whereof, I hereunto subscribe my name this 8th day of February A. D., 1929.

GILBERT T. SCHMIDLING.